(12) United States Patent
Sakamoto

(10) Patent No.: US 6,781,260 B2
(45) Date of Patent: Aug. 24, 2004

(54) PERMANENT MAGNET TYPE ROTARY MACHINE

(75) Inventor: Masafumi Sakamoto, Gunma (JP)

(73) Assignee: Japan Servo Co., Ltd., Gunma (JP)

( * ) Notice: Subject to any disclaimer, the term of this patent is extended or adjusted under 35 U.S.C. 154(b) by 0 days.

(21) Appl. No.: 10/272,549

(22) Filed: Oct. 16, 2002

(65) Prior Publication Data

US 2003/0102727 A1 Jun. 5, 2003

(30) Foreign Application Priority Data

Oct. 16, 2001 (JP) ........................................ 2001-317708

(51) Int. Cl.[7] ............................................. H02K 37/14
(52) U.S. Cl. .................................... 310/49 R; 310/184
(58) Field of Search .............................. 310/49 R, 216, 310/218, 112, 114, 162–165, 156.48, 180, 184

(56) References Cited

U.S. PATENT DOCUMENTS

| | | | | |
|---|---|---|---|---|
| 2,506,629 A | * | 5/1950 | Bilde et al. | 310/218 |
| 4,739,201 A | * | 4/1988 | Brigham et al. | 310/49 R |
| 4,912,353 A | * | 3/1990 | Kondo et al. | 310/259 |
| 5,289,064 A | | 2/1994 | Sakamoto | |
| 5,949,171 A | * | 9/1999 | Horski et al. | 310/216 |
| 6,304,018 B1 | * | 10/2001 | Ham et al. | 310/216 |

FOREIGN PATENT DOCUMENTS

| | | |
|---|---|---|
| JP | 111233/1993 | 10/1991 |
| JP | 10-023695 | 1/1998 |

* cited by examiner

Primary Examiner—Tran Nguyen
(74) Attorney, Agent, or Firm—Boyle Fredrickson Newholm Stein & Gratz S.C.

(57) ABSTRACT

A permanent magnet type rotary machine according to the present invention has a stator having an annular magnetic member and three, four, five or six stator magnetic poles (1) extending radially from the annular magnetic member, windings (3) of three, four or five phases, each wound around each of the stator magnetic poles (1), two sets of rotors (2) adjacent each other arranged in the axial direction and faced to the stator with an air gap therebetween, and two permanent magnets (51) magnetized in the axial direction. Each of the stator magnetic poles (1) has a plurality (Nr) of magnetic teeth at the tip end thereof, each set of the rotors (2) consists of two rotor elements (21, 22), each having Nr pieces of small tooth on the outer peripheral surface thereof, each of two permanent magnets (51) is held by the two rotor elements (21, 22) in each set of the rotor (2), and the two rotor elements (21, 22) in each set of the rotor (2) are deviated by ½ the pitch of the small rotor tooth from each other in the circumferential direction so that the small rotor teeth of adjacent rotor elements (22, 21) of two adjacent sets of the rotors (2) are the same in polarity. Nr is 3n±1, 4n±1, or 6n±1 (where, n is a positive integer).

11 Claims, 10 Drawing Sheets

PERMANENT MAGNET TYPE ROTARY MACHINE

BACKGROUND OF THE INVENTION

1. Field of the Invention

The present invention relates to a permanent magnet type rotary machine and, more particularly, relates to a hybrid (HB) type permanent magnet rotary machine or stepping motor for use in an office automation equipment or the like.

2. Description of the Prior Art

A three-phase permanent magnet type stepping motor is smaller in vibration than a two-phase permanent magnet type stepping motor. A number of transistors used in a bipolar type driving circuit of the three-phase stepping motor is six, whereas a number of transistors used in a bipolar type driving circuit of the two-phase permanent magnet type stepping motor is eight. Accordingly, the three-phase motor is better than the two-phase motor in general viewpoint. However, even in the three-phase motor, a number of harmonics are included in a field magnetic flux formed by the permanent magnet due to a number of pole teeth so that vibrations and noises are generated, even if a number of rotor pole pairs is increased, though the precision of the positioning and the fluctuation of rotation at the low speed of the motor are enhanced. A number multiplied by three, such as 3, 6, 9 or 12 etc. may be considered as a number of stator main magnetic poles of the three-phase motor. As inexpensive three-phase motors, three stator main magnetic poles are used in view of the simplicity in construction. Further, it is preferable to reduce the number of the stator main magnetic poles in order to increase the torque, because an interlinkage magnetic flux per one main magnetic pole is increased if the number of the main magnetic poles is reduced. A total quantity of magnetic flux $\Phi$ of a permanent magnet type rotor in case of the three-phase motor having six stator main magnetic poles is the same with that in case of the three-phase motor having three stator main magnetic poles, if the permanent magnet type rotors are the same with each other. It is assumed that a turn number N of the winding for each phase of the motor having six stator main magnetic poles is the same with that of the motor having three stator main magnetic poles, that a torque per one phase, an interlinkage magnetic flux per one stator main magnetic pole, and a turn number of the winding per one stator main magnetic pole of the motor having six stator main magnetic poles are represented by T6, $\Phi/6$ and N/2, respectively, and that a torque per one phase, an interlinkage magnetic flux per one stator main magnetic pole, and a turn number of the winding per one stator main magnetic pole of the motor having three stator main magnetic poles are represented by T3, $\Phi/3$ and N, respectively. In the motor having six stator main magnetic poles, one phase is composed of two stator main magnetic poles, so that following equation (1) can be obtained.

$$T6=k(\Phi/6)(N/2)I \times 2=k(\Phi NI/6) \tag{1}$$

Where, I represents a current.

In the motor having three stator main magnetic poles, one phase is composed of one stator main magnetic pole, so that a following equation (2) can be obtained.

$$T3=k(\Phi/3)NI \times 1=k(\Phi NI/3) \tag{2}$$

It is apparent from the comparison of the two equations (1) and (2) that the torque of the motor having three stator main magnetic poles is larger than that of the motor having fix stator main magnetic poles.

U.S. Pat. No. 5,289,064 corresponding to the Japanese patent No. 3,140,814 discloses such conventional rotary machine.

In case that the conventional rotary machine having three stator main magnetic poles and a hybrid type (HB) rotor, an unbalance electromagnetic force in the radial direction is generated when the rotary machine is energized, so that harmonic waves are generated and thus a cogging torque is increased if the number of the rotor teeth is large, and that the vibrations and the cogging torque may be increased due to the unbalance electromagnetic force and the eccentricity in the air gap. Accordingly, it is required to improve the rotary machine in the property and the cost.

In the widely used two-phase rotary machine, the number of stator main magnetic pales is eight, and no unbalance electromagnetic force is generated. However, if the number is four, the construction of the rotary machine and the winding work of the winding become simple, so that the cast can be reduced. A torque T8 obtained in case that the number of the stator main magnetic poles is eight can be expressed by an equation (3).

$$T8=k(\Phi/8)(N/4)I \times 4=k((\Phi NI/8) \tag{3}$$

A torque T4 obtained in case that the number is four can be expressed by an equation (4)

$$T4=k(\Phi/4)(N/2)I \times 2=k(\Phi NI/4) \tag{4}$$

As apparent from the comparison of the two equations (3) and (4), the torque T4 is larger than the torque T8, however, in case that the number is four a radial unbalance electromagnetic force is generated between the stator and the rotor, so that the vibration and noise are increased and that the precision of the positioning is deteriorated.

In the widely used five-phase rotary machine, the number of stator main magnetic poles is ten, and no unbalance electromagnetic force is generated. However, if the number is five, the construction of the rotary machine and the winding work of the winding become simple, so that the cost can be reduced. Further, the torque of the motor having five stator main magnetic poles is larger than the torque of the motor having ten stator main magnetic poles, however, a radial unbalance electromagnetic force is generated between the stator and the rotor, so that the vibration and noise are increased and that the precision of the positioning is deteriorated.

That is, an air gap between the rotor an the stator becomes uneven, because a small air gap between an outer ring of a bearing and a bracket, as well as a small air gap between an inner surface of a bearing and an outer periphery surface of a shaft are varied, so that a cogging torque and a vibration when the motor is energized are increased, and that the noise are generated. The air gap in the permanent magnet type HB rotary machine is normally small as about $50 \times 10^{-6}$ m, so that if the air gap becomes uneven by a small fluctuation of the bearing, the vibration and the noise become large. The mechanism to generate the unbalance electromagnetic force will be explained with reference to the conventional example.

U.S. Pat. No. 5,289,064 discloses the three-phase rotary machine having three stator main magnetic poles and a HB type rotor, the number Nr of the rotor teeth being $3n \pm 1$, where n is a positive integer. In order to simplify the explanation, the pole pair number of the rotor is determined as one. In such a case that $Nr=3n \pm 1$, n=0, and Nr=1, the vertically sectional side view of the rotary machine can be shown as FIG. 7, and the relation between the stator and the rotor of the three-phase rotary machine when it is energized ban be shown as FIG. 8 showing a vertical section of the rotary machine. As shown in FIG. 7, a permanent magnet 5 is magnetized in the axial direction of a rotary shaft 4 so as to form two poles. In FIG. 7, a reference numeral 1 denotes three stator main magnetic poles extending radially from an annular magnetic yoke, 2 denotes a HB type magnetic rotor, 3 denotes three-phase stator windings, each wound around each of stator main magnetic poles, 6 and 7 denote front and back brackets of non-magnetic material such as aluminum, respectively, and 8 denotes bearings. The S pole of the rotor 2 is attracted upwards and the N pole of the rotor 2 is attracted downwards, so that the rotary shaft 4 receives a moment force, and if any air gap exists between the rotary shaft 4 and the bearing 8, the air gap between the stator magnetic pole 1 and the rotor 2 becomes uneven. FIG. 9 shows vectors showing components of upper and lower directions of the unbalance force shown in FIG. 8. In FIG. 9, F1 shows an attractive force generated between the U phase of the stator 1 and the S pole of the rotor 2 shown in FIG. 8. The rotor is of HB type, so that the form of the magnetic flux from the permanent magnet is not a sine wave. Accordingly, total attractive forces formed between the N pole of the rotor 2 and the V phase of the stator 1, and between the N pole and W phase of the stator 1 are F2, respectively, if the densities of the magnetic flux in the air gaps of the U, V and W phase are the same substantially. The F1 is equal substantially in value to the F2, but the F1 is opposite in direction to the F2.

FIG. 10A and FIG. 10B show a conventional HB type rotor of the two-phase motor having four stator main magnetic poles. FIG. 10A shows a relation between the stator and the N pole of the rotor, for example. A relation between the rotor small teeth and the four stator main magnetic poles when one phase of the winding is energized is shown in FIG. 11. As shown in FIG. 11, the main magnetic pole ① of one phase is magnetized to S pole, whereas the main magnetic pole ③ of one phase is magnetized to N pole. In this case, unbalance forces Fn and Fs are generated as shown in FIG. 10B, a moment force is applied on the bearing as loads, so that the air gap becomes unevn. The affection of the above becomes large in the HB type stepping motor, because the air gap is small.

The above unbalance forces generated in the rotary machine cannot be eliminated by using two sets of HB type rotors.

FIG. 12 shows such a case that a rotor element 21 is magnetized to S pole and a rotor element 22 is magnetized to N pole in each set of HB type rotor. A reference numeral 9 denotes a non-magnetic member inserted between the adjacent rotor elements 21 and 22 of different polarities of adjacent sets of HB type rotors in order to insulate magnetically them. An equation (5) can be obtained if radial forces F1, F2, F3 and F4 are applied to the rotor elements 21, 22, 21, 22 arranged in this order, respectively, a distance between a center of the left side bearing 8 and a point where the radial force F1 is applied is L1, a distance between F1 and F2 is L2, a distance between F2 and F3 is L3, a distance between F3 and F4 is L4, and F1=F2=F3=F4=F, and L2=L4.

$$M = L1F1 + (L1+L2+L3)F3 - (L1+L2)F2 - (L1+L2+L3+L4) \times F4 = -(L2+L4)F \quad (5)$$

It is noted from the above that the unbalance moment M is not eliminated.

SUMMARY OF THE INVENTION

In order to solve the foregoing problem in the conventional rotary machine, it is an object of the present magnet type rotary machine comprising a stator having an annular magnetic member and three stator magnetic poles extending radially from the annular magnetic member, windings of three phases, each wound around each of the stator magnetic poles, two sets of rotors adjacent each other arranged in the axial direction and faced to the stator with an air gap therebetween, and two permanent magnets magnetized in the axial direction, wherein each of the stator magnetic poles has a plurality of magnetic teeth at the tip end thereof, each set of the rotors consists of two rotor elements, each having Nr pieces of small tooth on the outer peripheral surface thereof, each of two permanent magnets is held by the two rotor elements in each set of the rotor, and the two rotor elements in each set of the rotor are deviated by ½ the pitch of the small rotor tooth from each other in the circumferential direction so that the small rotor teeth of adjacent rotor elements of two adjacent sets of the rotors are the same in polarity.

It is another object of the present invention to provide a permanent magnet type rotary machine comprising a stator having an annular magnetic member and four stator magnetic poles extending radially from the annular magnetic member, windings of two phases, each wound around each of the stator magnetic poles, two sets of rotors adjacent each other arranged in the axial direction and faced to the stator with an air gap therebetween, and two permanent magnets magnetized in the axial direction, wherein each of the stator magnetic poles has a plurality of magnetic teeth at the tip end thereof, each set of the rotors consists of two rotor elements, each having Nr pieces of small tooth on the outer peripheral surface thereof, each of two permanent magnets is held by the two rotor elements in each set of the rotor, and the two rotor elements in each set of the rotor are deviated by ½ the pitch of the small rotor tooth from each other in the circumferential direction so that the small rotor teeth of adjacent rotor elements of two adjacent sets of the rotors are the same in polarity.

It is further object of the present invention is to provide a permanent magnet type rotary machine comprising a stator having an annular magnetic member and five stator magnetic poles extending radially from the annular magnetic member, windings of five phases, each wound around each of the stator magnetic poles, two sets of rotors adjacent each other arranged in the axial direction and faced to the stator with an air gap therebetween, and two permanent magnets magnetized in the axial direction, wherein each of the stator magnetic poles has a plurality of magnetic teeth at the tip end thereof, each set of the rotors consists of two rotor elements, each having Nr pieces of small tooth on the outer peripheral surface thereof, each of two permanent magnets is held by the two rotor elements in each set of the rotor, and the two rotor elements in each set of the rotor are deviated by ½ the pitch of the small rotor tooth from each other in the circumferential direction so that the small rotor teeth of adjacent rotor elements of two adjacent sets of the rotors are the same in polarity.

It is still further object of the present invention is to provide a permanent magnet type rotary machine comprising a stator having an annular magnetic member and six stator magnetic poles extending radially from the annular magnetic member, windings of three phases, each wound around each of the stator magnetic poles, two sets of rotors adjacent each other arranged in the axial direction and faced to the stator with an air gap therebetween, and two permanent magnets magnetized in the axial direction, wherein each of the stator magnetic poles has a plurality of magnetic teeth at the tip end thereof, each set of the rotors consists of two rotor elements, each having Nr pieces of small tooth on the outer peripheral surface thereof, each of two permanent magnets is held by the two rotor elements in each set of the rotor, and the two rotor elements in each set of the rotor are deviated by ½ the pitch of the small rotor tooth from each other in the circumferential direction so that the small rotor teeth of adjacent rotor elements of two adjacent sets of the rotors are the same in polarity.

Adjacent end surfaces of the tip ends of the adjacent stator magnetic poles are connected together.

Nr is 3n±1, 4n±1 or 6n±1, where n is a positive integer.

These and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

DESCRIPTION OF THE PREFERRED EMBODIMENTS

A first invention of the present invention will now be explained with reference to FIG. 1 and FIG. 2.

Figure 1:
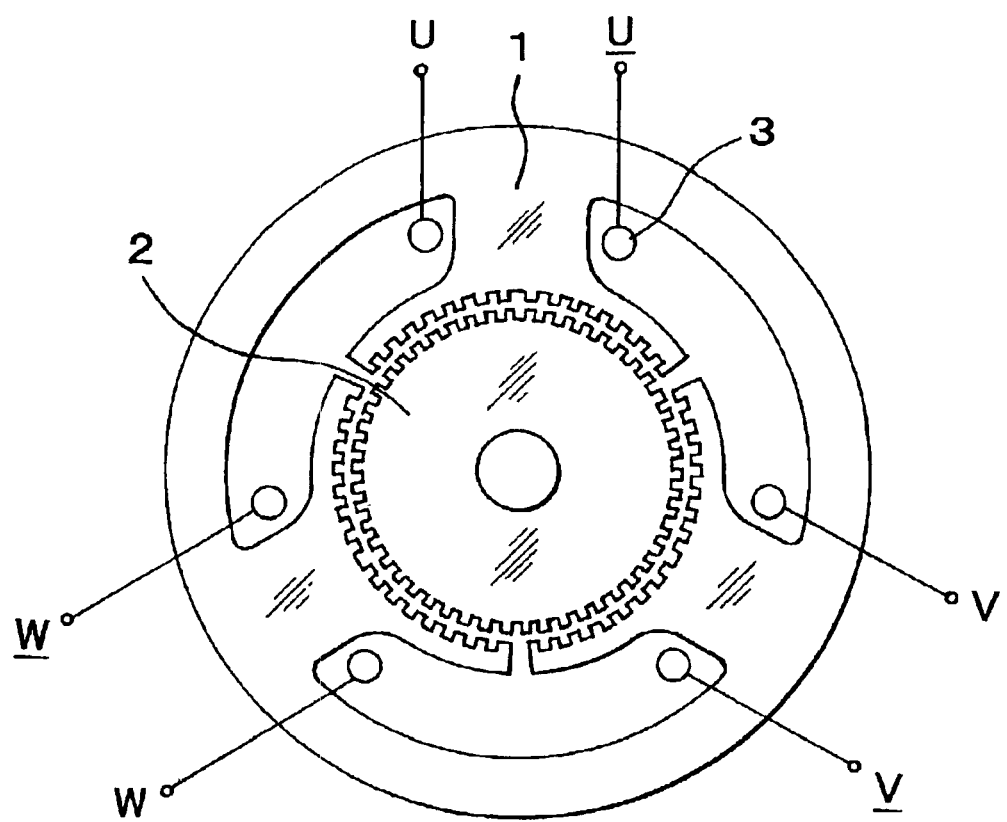
FIG. 1 is a front view of a permanent magnet type rotary machine of a first embodiment of the present invention.
Figure 2:
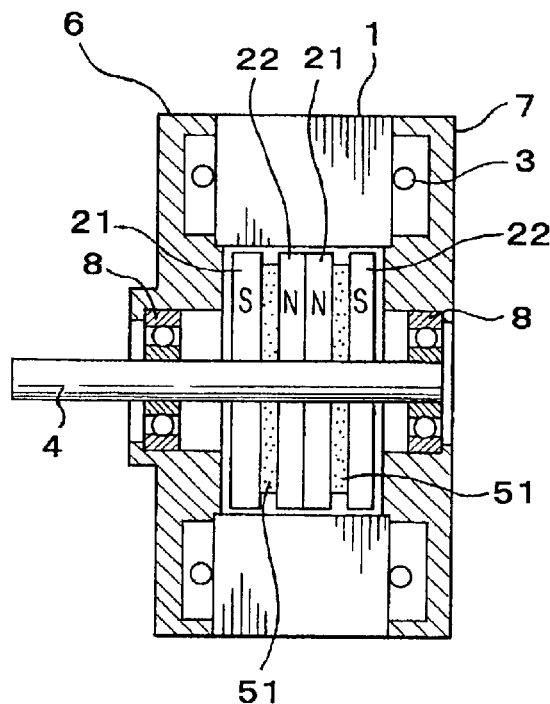
FIG. 2 is a vertical sectional side view of the permanent magnet type rotary machine shown in FIG. 1.

FIG. 1 is a front view of a permanent magnet type rotary machine and FIG. 2 is a vertical sectional side view of the permanent magnet type rotary machine shown in FIG. 1.

Parts of the motor which are similar to corresponding parts of the conventional motor shown in FIG. 7 to FIG. 12 have been given corresponding reference numerals and need not be further redescribed.

In the first embodiment of the present invention, a stator is composed of an annular magnetic member, three stator magnetic poles 1 extending radially from the annular magnetic member, windings 3 of three phases, each wound around each of the stator magnetic poles 1, and a plurality of magnetic teeth at the tip end of each of the stator magnetic poles 1. A rotor 2 is composed of two sets of rotors adjacent each other arranged in the axial direction and faced to the stator with an air gap therebetween.

Each set of the rotors consists of two rotor elements21 and 22, each having Nr pieces of small tooth on the outer peripheral surface thereof and a permanent magnet 51 magnetized in the axial direction and held by the two rotor elements 21 and 22 in each sets of the rotors. The two rotor elements 21 and 22 in each set of the rotor are deviated by ½ the pitch of the small rotor tooth from each other in the circumferential direction, and the small rotor teeth of adjacent rotor elements 22 and 21 of two adjacent sets of the rotors are the same in polarity.

It is not always necessary to contact the two adjacent rotor elements 22 and 21 of two adjacent sets of the rotors to each other and an air gap may be formed or a magnetic insulating member may be inserted therebetween.

Figure 3:
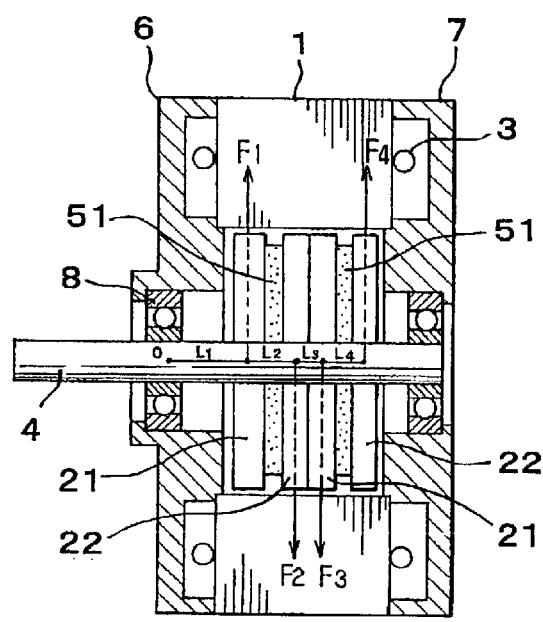
FIG. 3 is a view for explaining the principle of the present invention.

FIG. 3 shows radial forces F1~F4 when the three-phase permanent magnet type rotary machine is excited. In this embodiment, the unbalance moment force M can be expressed by an equation (6).

$$M = L1F1 + (L1+L2+L3+L4)F4 - (L1+L2)F2 - (L1+L2+L3)F3 = (L4-L2)F = 0 \qquad (6)$$

As stated above, the unbalance moment force M generated in the rotary machine having three stator main magnetic poles can be cancelled substantially. By applying the present invention to a three-phase rotary machine having three stator main magnetic poles, and Nr of 3n±1, a high torque and a high precision can be obtained.

Figure 4A:
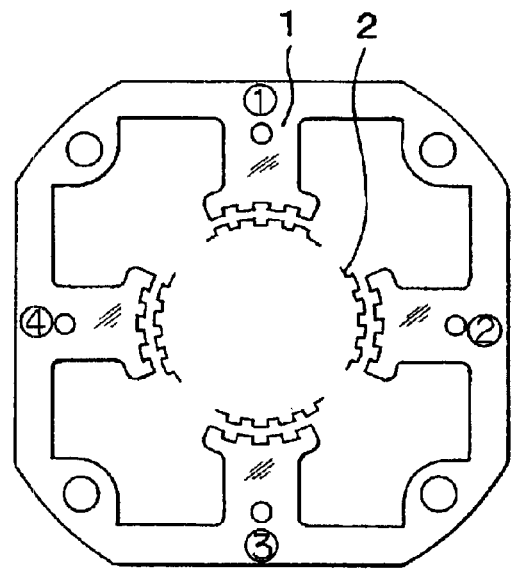
FIG. 4A is a view for explaining a permanent magnet type rotary machine of a second embodiment according to the present invention.
Figure 4B:
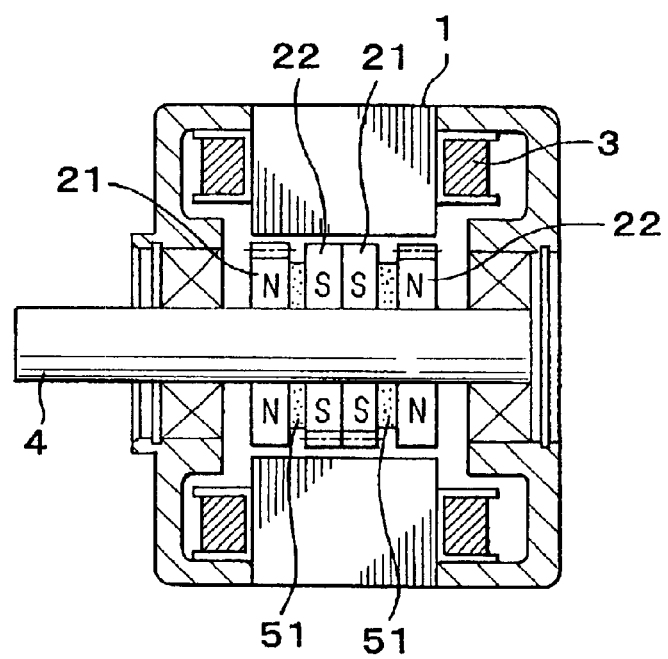
FIG. 4B is a vertical sectional side view of the permanent magnet type rotary machine shown in FIG.4A.

FIG. 4A and FIG. 4B show a two-phase rotary machine having four stator main magnetic poles of an embodiment according to the present invention. As explained by the equation (4), this two-phase rotary machine can generate the maximum torque. In this case, the unbalance moment can be eliminated as like as the equation (1).

In the three-phase rotary machine, the unbalance moment can be eliminated substantially by the three-phase excitation. Similarly, in the two-phase rotary machine, the unbalance moment can be eliminated perfectly by one-phase excitation, and the freedom of the driving condition can be enhanced compared with that in the three-phase rotary machine.

Figure 5:
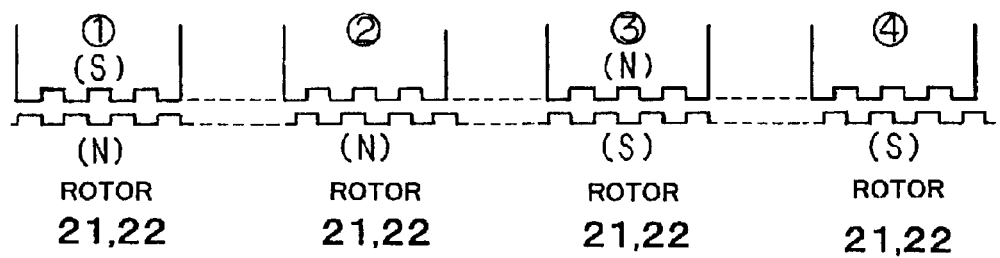
FIG. 5 is a view for explaining the permanent magnet type rotary machine shown in FIG. 4B.

FIG. 5 shows relations in position of each of the four stator main magnetic poles ① to ④ and the rotor small teeth of the rotor elements 21 and 22. In case of a two-phase rotary machine having symmetric four stator main magnetic poles deviated by 90 degrees one another, the rotor small tooth number Nr can be obtained form an equation (7).

$$90°/Nr = -/+\{360°/4 - 360°n/Nr\} \qquad (7)$$

Each side of the equation (7) means a step angle and an equation (8) can be obtained thereform.

$$Nr = 4n \pm 1 \qquad (8)$$

For example, Nr of 75 and a step angles 1.2° can be obtained when n is 19, and Nr of 125 and a step angle of 0.72° can be obtained when n is 31. In a two-phase rotary machine having four stator main magnetic poles according to the equation (8), the rotor can be formed by laminating plates while shifting by 90° one another and the precision can be increased.

Figure 13:
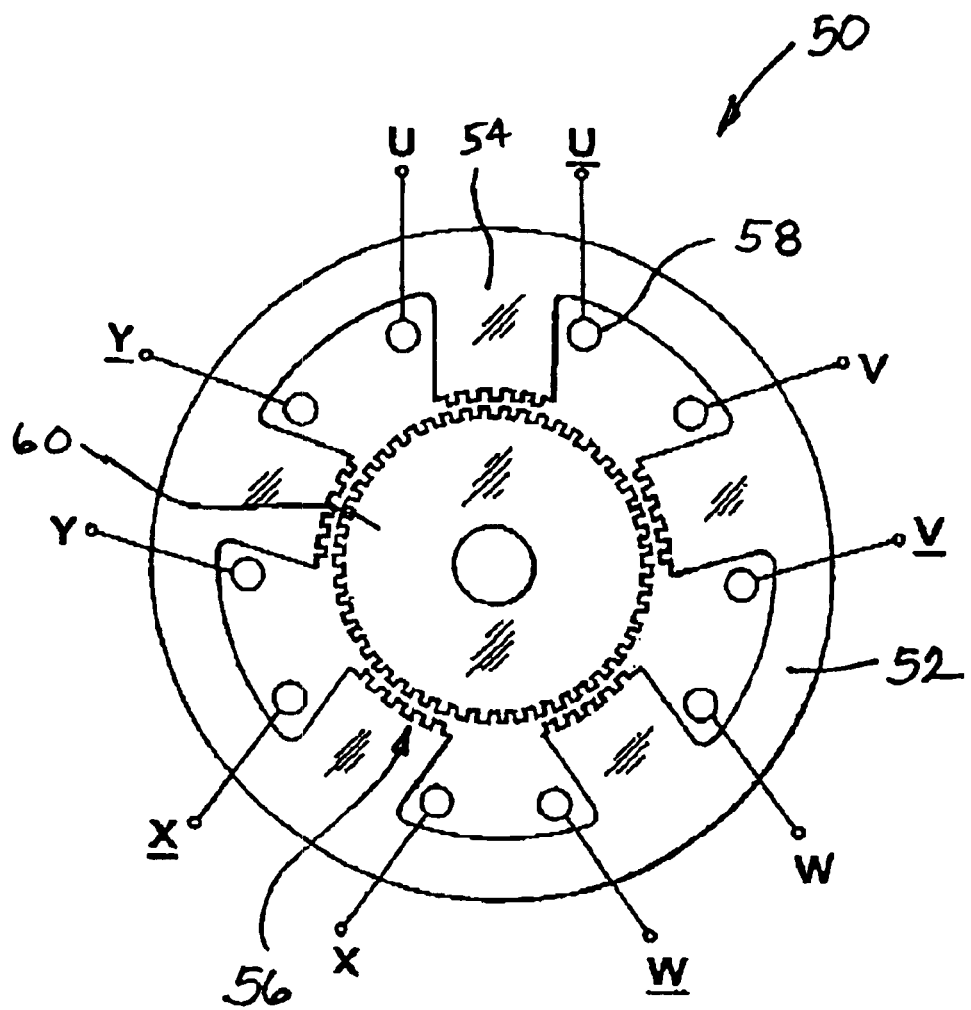
FIG. 13 is a front view of a permanent magnet type rotary machine of a fourth embodiment according to the present invention.

In a five-phase HB type stepping motor, no unbalance force is generated if the number of the stator main magnetic poles is ten. However, in a five-phase HB type stepping motor having five stator main magnetic poles, an unbalance force is generated, though the torque is increased by the same reason with in the case of three-phase or two-phase rotary machine. In order to eliminate the unbalance force it is preferable to use a construction similar to that of the three-phase rotary machine. As shown in FIG. 13, another construction of the present invention is a five-phase rotary machine 50 having a stator 52 that includes an annular magnetic member and five stator magnetic poles 54 extending radially from the annular magnetic member. Each of the stator magnetic poles 54 has a plurality of magnetic teeth 56 located at a tip end. The machine 50 further include windings 58 of five phases, each wound around each of the stator magnetic poles 54. The rotor 60 includes two sets of rotors positioned adjacent to each other, arranged in the axial direction, and faced to the stator with an air gap therebetween in a manner similar to the rotor 2 shown in FIGS. 1 and 2.

Figure 6:
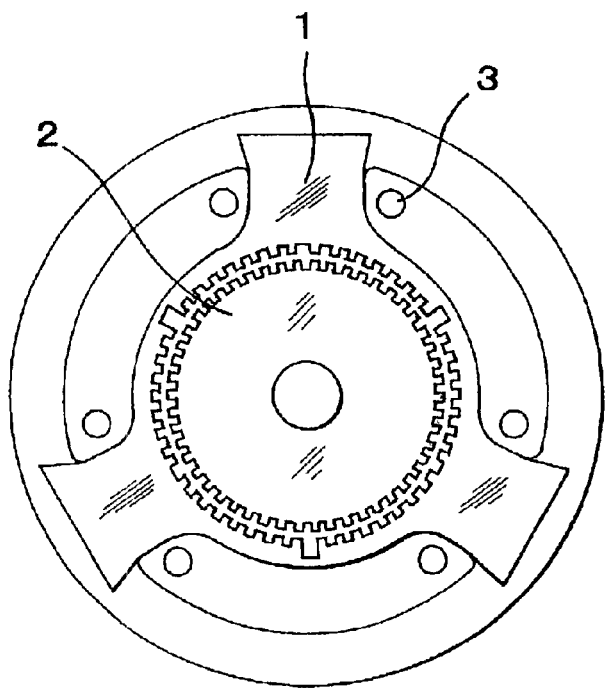
FIG. 6 is a front view of a permanent magnet type rotary machine of a third embodiment according to the present invention.
Figure 7:
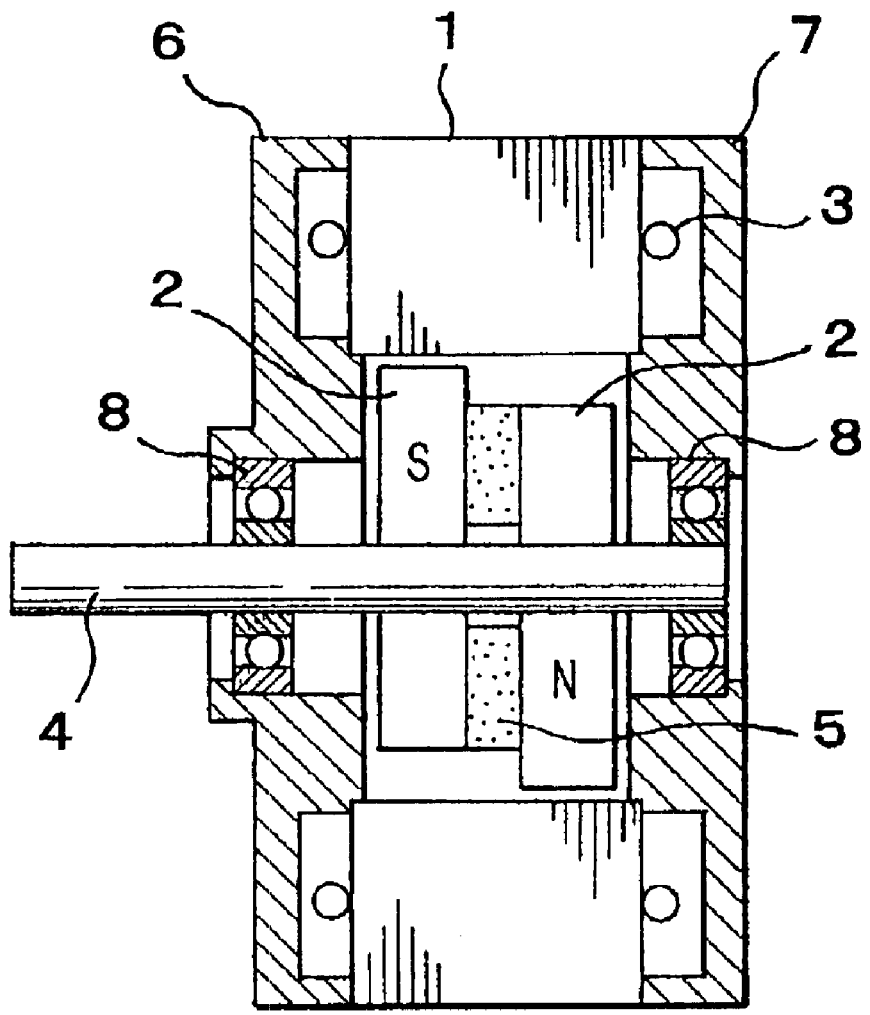
FIG. 7 is a vertical sectional side view of a conventional permanent magnet type rotary machine.
Figure 8:
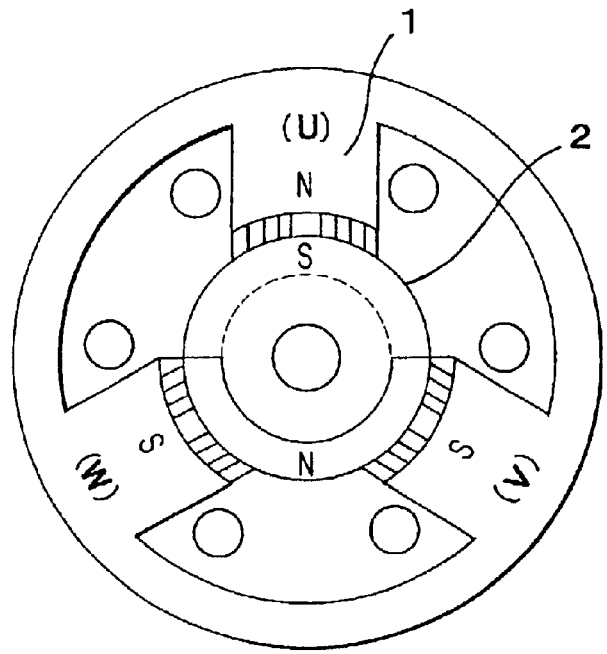
FIG. 8 is a front view of the permanent type rotary machine shown in FIG. 7.
Figure 9:
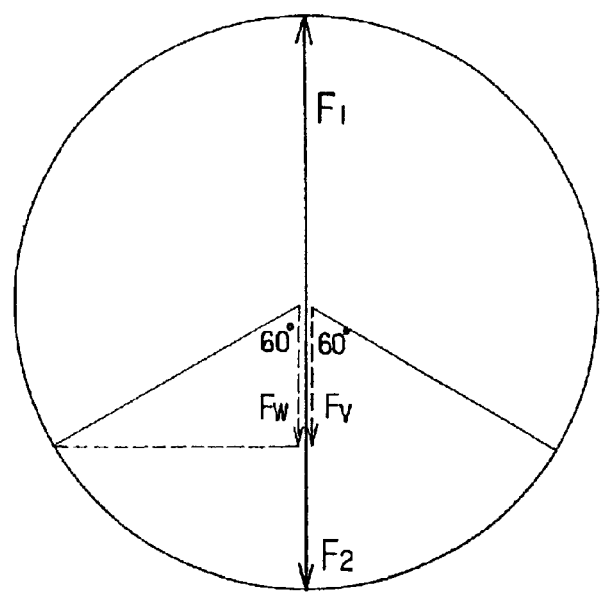
FIG. 9 is a view for explaining vectors of the permanent magnet type rotary machine shown in FIG. 8.
Figure 10A:
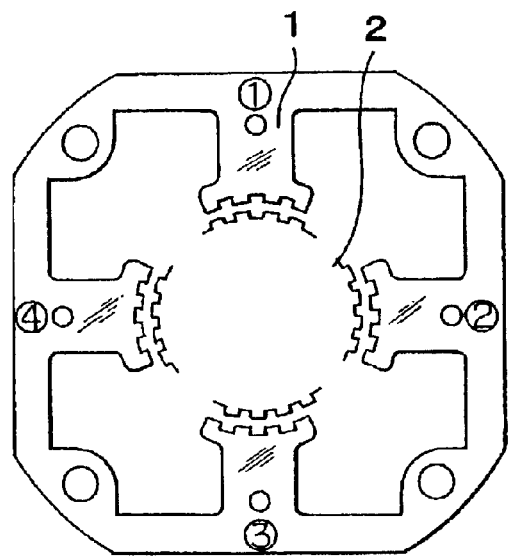
FIG. 10A is a view for explaining another conventional permanent magnet type rotary machine.
Figure 10B:
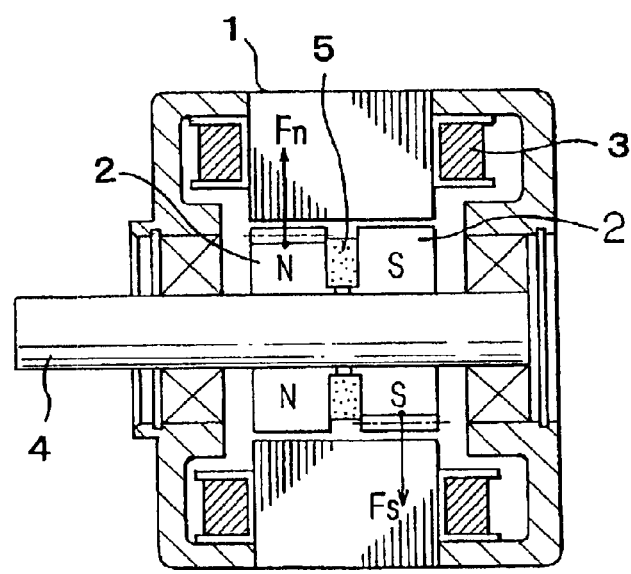
FIG. 10B is a vertical sectional side view of the permanent magnet type rotary machine shown in FIG. 10A.
Figure 11:
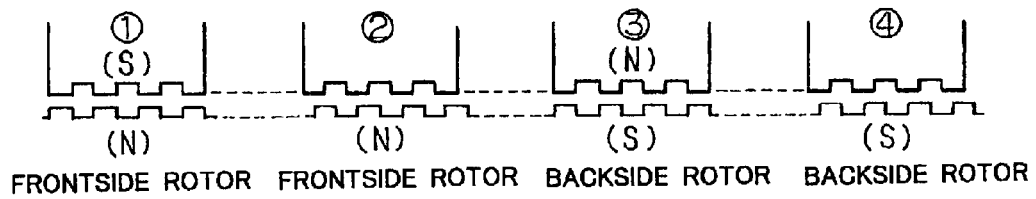
FIG. 11 is a view for explaining the permanent magnet type rotary machine shown in FIG. 10B.

FIG. 6 shows a rotary machine of another embodiment of the present invention. In this embodiment, the stator main magnetic poles is reduced in number by one half than the conventional rotary machine, adjacent ends of the adjacent stator main magnetic poles are contacted each other, and a base end of each of the stator main magnetic poles is fitted into the annular magnetic portion of the stator, so that the unbalance force can be eliminated, and the torque can be increased twice that of the conventional rotary machine as shown in the equations (2) and (4).

In said embodiment, the magnetic flux is leaked through the contact portion of the adjacent ends of the adjacent stator main magnetic poles. However, each stator main magnetic pole can be inserted into each winding wound around a bobbin. Accordingly, the space factor of the winding can be improved compared with that the wire of the winding is wound around the magnetic pole through a slot opening, and the wire of the winding can be wound around the bobbin with a high speed, so that the number of the working steps and thus the cost can be reduced. The above structure can be applied to the two-phase, three-phase or five-phase rotary machine, similarly.

In case that the three-phase rotary machine having six stator main magnetic poles and rotor teeth of odd number Nr, an unbalance force is generated. However, the precision can be enhanced if the odd number Nr is determined according to an equation (9).

$$60°/Nr = -/+\{360°/6 - 360° \, n/Nr\} \quad (9)$$

Each side of the equation (9) means a step angle and an equation (10) can be obtained therefrom.

$$Nr = 6n \pm 1 \quad (10)$$

For example, Nr of 25 and a step angles of 2.4° can be obtained when n is 4, and Nr of 125 and a step angle of 0.48° can be obtained when n is 21.

Figure 12:
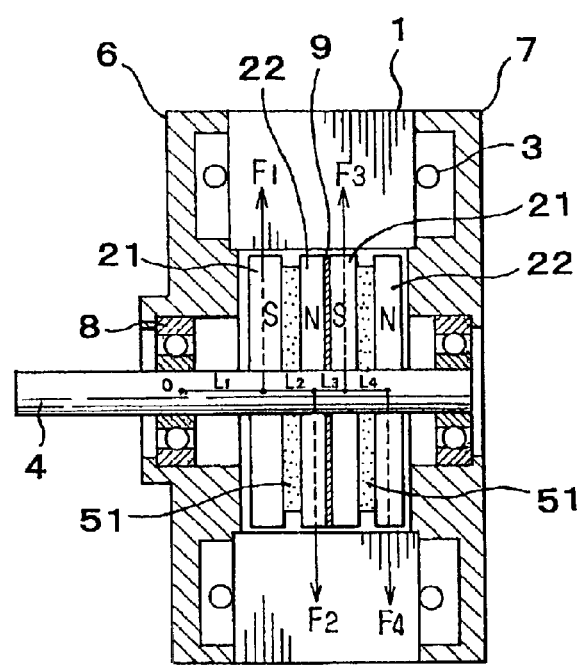
FIG. 12 is a vertical sectional side view of the other permanent magnetic type rotary machine.
Figure 14:
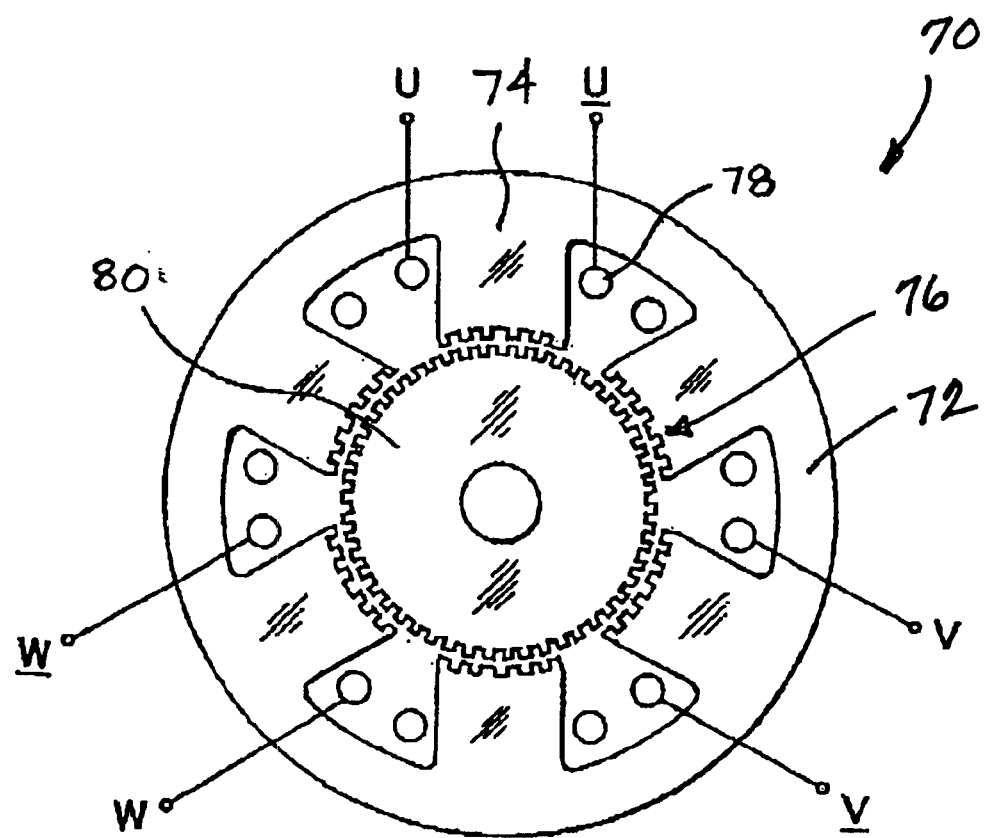
FIG. 14 is a front view of a permanent magnet type rotary machine of a fifth embodiment according to the present invention.

In case that a rotary machine having six stator main magnetic poles of a high torque is required, a rotor longer in the axial direction compared with the diameter thereof is used. Such longer rotor can be formed of two sets of rotor elements connected in series, however, a magnetic insulating plate 9 has to be inserted between the two sets of rotor elements as shown in FIG. 12, so that the torque is reduced. Accordingly, in another construction of the present invention as shown in FIG. 14, the structure of the present invention is applied to the three-phase rotary machine 70 having a stator 72 with six stator main magnetic poles 74 that extend radially from an annular magnetic member. Each of the stator magnetic poles 74 has a plurality of magnetic teeth 76 at a tip end thereof. The stator 72 further includes windings 78 of three phases, each wound around each of the stator magnetic poles 74. The machine further includes a rotor 80 having two sets of rotors positioned adjacent to each other, arranged in the axial direction, and faced to the stator with an air gap therebetween in a manner similar to the rotor 2 shown in FIGS. 1 and 2.

The mall teeth of the two rotor elements 21 and 22 adjacent with each other shown in FIG. 4B are aligned as shown by the dot-and-dashed line. This dot-and-dashed line represents that the annular displacement ($a_m$) between adjacent sets of rotor elements of the rotor to be zero.

Having such a configuration as described above, the permanent magnet type rotary machine according to the present invention has excellent effects as follows.

(1) The radial unbalance force generated in the three-phase, two-phase or five-phase rotary machine having reduced number of the stator main magnetic poles can be cancelled and the torque can be increased abut twice compared with the torque of the conventional rotary machine.

(2) According to the three-phase rotary machine having three stator main magnetic poles of the same size with the conventional rotary machine, the maximum torque can be obtained theoretically.

(3) According to the two-phase rotary machine having four stator main magnetic poles, the maximum torque can be obtained among the widely used two-phase rotary machines, and no radial unbalance force is generated even in the one-phase exciting.

(4) By the combination of the partially divided cores, the quantity of cupper can be increased and the large torque can be maintained with low cost.

(5) The radial unbalance force can be eliminated even in the rotary machine of high torque having six stator main magnetic poles and the rotor with odd number rotor teeth.

(6) The present invention can be applied to any rotary machine of outer rotor type.

While the invention has been particularly shown and described with reference to the preferred embodiments thereof, it will be understood by those skilled in the art that various changes in form and details may be made therein without departing from the spirit and scope of the invention as defined by the appended claims.

What is claimed is:

1. A permanent magnet rotary machine comprising:
a stator having an annular magnetic member and three stator magnetic poles extending radially from the annular magnetic member, a plurality of windings of three phases, each winding being wound around each of the stator magnetic poles, two adjacent sets of rotors, said rotors are arranged in the axial direction without an angular displacement therebetween and said rotors face the stator with an air gap therebetween, and two permanent magnets magnetized in the axial direction, wherein each of the stator magnetic poles has a plurality of magnetic teeth at the tip end thereof, each set of the rotors consists of two rotor elements, each of said rotor elements having Nr pieces of small tooth on the outer peripheral surface thereof, each of two permanent magnets is held by the two rotor elements in each set of the rotor, and the two rotor elements in each set of the rotor are deviated by ½ the pitch of the small rotor tooth from each other in the circumferential direction so that the small rotor teeth of adjacent rotor elements of two adjacent sets of the rotors are the same in polarity.

2. The permanent magnet type rotary machine as claimed in claim 1, wherein Nr is 3n±1 (where, n is a positive integer).

3. A permanent magnet rotary machine comprising:

a stator having an annular magnetic member and four stator magnetic poles extending radially from the annular magnetic member, a plurality of windings of two phases, each winding being wound around each of the stator magnetic poles, two adjacent sets of rotors, said rotors are arranged in the axial direction without an angular displacement therebetween and said rotors face the stator with an air gap therebetween, and two permanent magnets magnetized in the axial direction, wherein each of the stator magnetic poles has a plurality of magnetic teeth at the tip end thereof, each set of the rotors consists of two rotor elements, each of said rotor elements having Nr pieces of small tooth on the outer peripheral surface thereof, each of two permanent magnets is held by the two rotor elements in each set of the rotor, and the two rotor elements in each set of the rotor are deviated by ½ the pitch of the small rotor tooth from each other in the circumferential direction so that the small rotor teeth of adjacent rotor elements of two adjacent sets of the rotors are the same in polarity.

4. The permanent magnet type rotary machine as claimed in claim 3, wherein Nr=4n±1 (where, n is a positive integer).

5. A permanent magnet rotary machine comprising:

a stator having an annular magnetic member and five stator magnetic poles extending radially from the annular magnetic member, a plurality windings of five phases, each winding being wound around each of the stator magnetic poles, two adjacent sets of rotors, said rotors are arranged in the axial direction without an angular displacement therebetween and said rotors face the stator with an air gap therebetween, and two permanent magnets magnetized in the axial direction, wherein each of the stator magnetic poles has a plurality of magnetic teeth at the tip end thereof, each set of the rotors consists of two rotor elements, each of said rotor elements having Nr pieces of small tooth on the outer peripheral surface thereof, each of two permanent magnets is held by the two rotor elements in each set of the rotor, and the two rotor elements in each set of the rotor are deviated by ½ the pitch of the small rotor tooth from each other in the circumferential direction so that the small rotor teeth of adjacent rotor elements of two adjacent sets of the rotors are the same in polarity.

6. The permanent magnet rotary machine as claimed in claim 1, wherein adjacent end surfaces of the tip ends of the adjacent stator magnetic poles are connected together.

7. The permanent magnet rotary machine as claimed in claim 3, wherein adjacent end surfaces of the tip ends of the adjacent stator magnetic poles are connected together.

8. The permanent magnet rotary machine as claimed in claim 5, wherein adjacent end surfaces of the tip ends of the adjacent stator magnetic poles are connected together.

9. A permanent magnet rotary machine comprising:

a stator having an annular magnetic member and six stator magnetic poles extending radially from the annular magnetic member, a plurality of windings of three phases, each winding wound around each of the stator magnetic poles, two adjacent sets of rotors, said rotors are arranged in the axial direction without an annular displacement therebetween and said rotors face the stator with an air gap therebetween, and two permanent magnets magnetized in the axial direction, wherein each of the stator magnetic poles has a plurality of magnetic teeth at the tip end thereof, each set of the rotors consists of two rotor elements, each of said rotor elements having Nr pieces of small tooth on the outer peripheral surface thereof, each of two permanent magnets is held by the two rotor elements in each set of the rotor, and the two rotor elements in each set of the rotor are deviated by ½ the pitch of the small rotor tooth from each other in the circumferential direction so that the small rotor teeth of adjacent rotor elements of two adjacent sets of the rotors are the same in polarity.

10. The permanent magnet type rotary machine as claimed in claim 9, wherein Nr is 6n±1 (where, n is a positive integer).

11. A permanent magnet rotary machine comprising:

a stator having an annular magnetic member and three stator magnetic poles extending radially from the annular magnetic member;

a plurality of windings of three phases, each winding being wound around each of the stator magnetic poles; and first set and second sets of rotors that are arranged in the axial direction that are in contact with one other, and that face the stator with an air gap therebetween, wherein each of the first and second set of rotors includes a permanent magnet magnetized in the axial direction, wherein each of the stator magnetic poles has a plurality of magnetic teeth at a tip end thereof, wherein each of the first and second sets of the rotors consists of two rotor elements arranged in the axial direction, each of said rotor elements having Nr pieces of small tooth on the outer peripheral surface thereof, wherein each of the permanent magnets is held by the rotor elements of each set of rotor, and wherein the two rotor elements in each set of the rotor are deviated by ½ the pitch of the small rotor tooth from each other in the circumferential direction so that the small rotor teeth of adjacent rotor elements of the first and second sets of rotors are the same in polarity.

* * * * *